Figure 1:
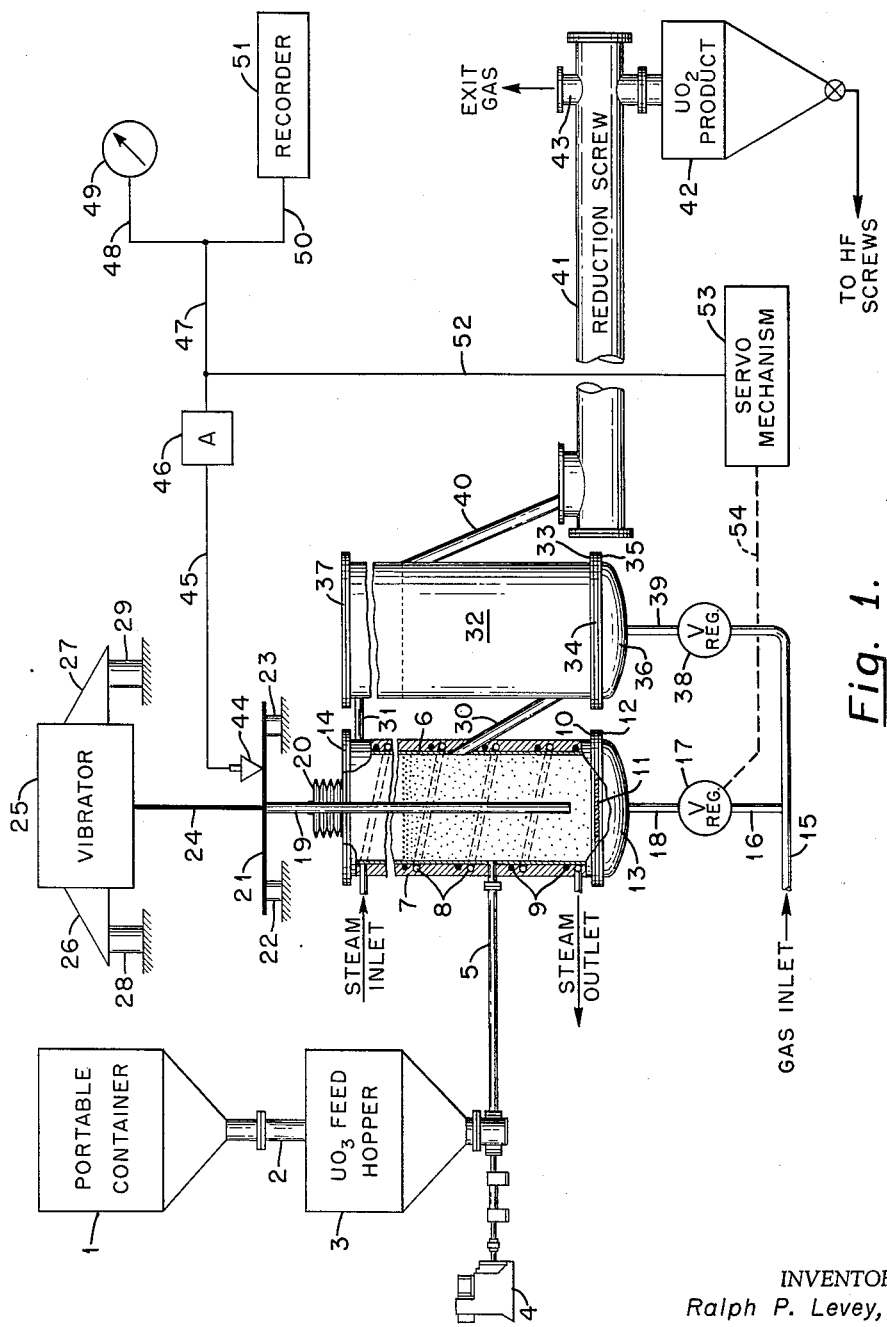

INVENTORS
Ralph P. Levey, Jr.
Andrew H. Fowler

ATTORNEY

3,012,848
METHOD FOR SENSING DEGREE OF FLUIDIZATION IN A FLUIDIZED BED

Ralph P. Levey, Jr., and Andrew H. Fowler, Oak Ridge, Tenn., assignors to the United States of America as represented by the United States Atomic Energy Commission Filed Nov. 12, 1958, Ser. No. 773,525
2 Claims. (Cl. 23—14.5)

The present invention relates to a method and apparatus by means of which the degree of fluidization in a fluidized bed reactor can be continuously and precisely determined.

Fluidization may be described briefly as the phenomenon which occurs when a fluid, normally a gas, passes upward through a bed of solid particles at sufficient velocity to prevent the particles from remaining in intimate contact with one another. In this condition, each particle is surrounded by a film of fluid and a certain degree of freedom to move is imparted to the solid particles. In the fluidized state, the solid-gas phase behaves much like a liquid, having the ability to flow readily under the influence of a hydrostatic head. At high gas velocities, a large percentage of the gas flows upward through the solid particles in the form of bubbles or pockets of gas and a vigorous agitation of the solids occurs.

Continuous fluid bed reactors are useful in reactions involving a gas and a finely divided solid; for example in reducing uranium trioxide to uranium dioxide as a step in the process of converting uranium trioxide to uranium hexafluoride. Uranium hexafluoride is the stable compound used in the gaseous diffusion process for the separation of the isotopes of uranium.

By definition, fluidization in a fluid bed takes place when the particulate materials constituting the bed become suspended in an upwardly moving stream of suitable gas.

By visual observation of the depth of the material within the reactor, the lower and upper limits of the rates of gas flow required to move the material depth from its normal position to its maximum position where complete fluidization takes place can be determined. The range of gas flow rates through which the increase in material depth can be observed visually is referred to as the fluidized region and it is within this region that a knowledge of the degree of fluidization is desired.

In the art of fluid bed reactor operation, there was heretofore no method by which the degree of fluidization in such a reactor could be satisfactorily determined on a direct and continuous basis. It is desirable to know and control the degree of fluidization in a reactor since such knowledge will enable an operator to know and select the optimum fluidization for maximum efficiency in the reduction process. The method of calibrating bed pressure drop in terms of fluidization is considered impractical for the reason that the rate of change of bed pressure drop with increase in fluidization in the region of optimum operating conditions is very small. Furthermore, such a method would require a different calibration for each gas or mixture thereof that is used as a fluidizing medium. It has been the usual practice in the past to compute, by any suitable means, the rate of flow necessary to maintain the bed in a fluidized state. The main difficulty with such a method, however, is that one has no way of knowing whether or not optimum conditions of reactor operation are being met within the reactor. Without a proper rate of flow, there is too much channelling, which is a known cause of reactor inefficiency.

With a knowledge of the shortcomings of the bed pressure drop method, and the rate of flow method for detecting the degree of fluidization in a fluid bed reactor, and the channelling problem, it is a primary object of this invention to provide a method and apparatus by means of which the degree of fluidization in a fluidized bed reactor can be continuously and precisely determined.

It is another object of this invention to provide a method and apparatus wherein the rate of flow of the fluidizing gas is automatically controlled so as to provide optimum conditions of reactor operation.

It is still another object of this invention to provide a method and apparatus wherein channelling within the reactor is reduced.

Figure 2:
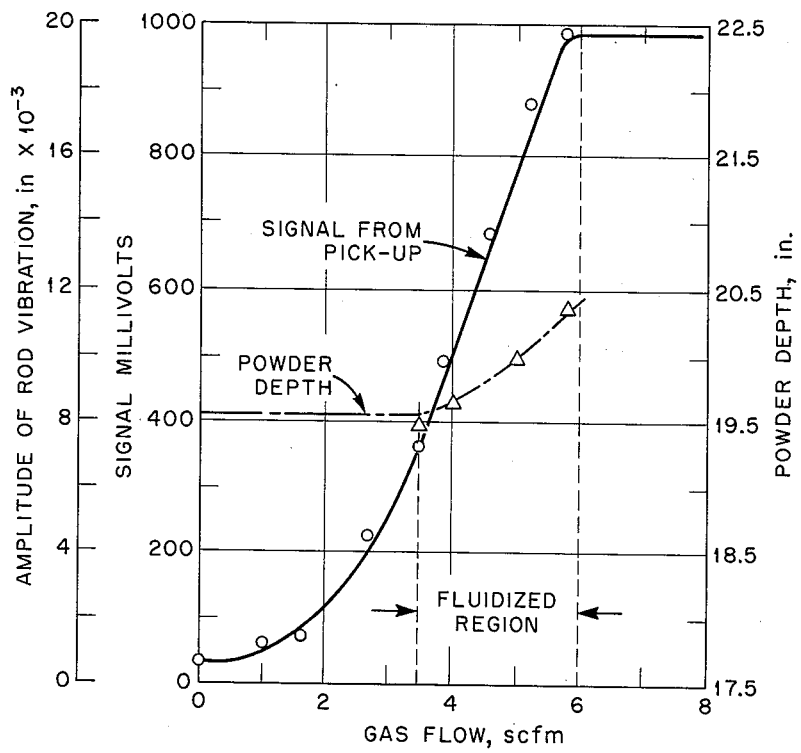

These and other objects and advantages of this invention will be apparent from a consideration of the following detailed specification and the accompanying drawings, wherein:

FIG. 1 shows a schematic diagram of a fluid bed reactor provided with a vibration responsive detecting and flow control means; and, FIG. 2 shows a graph which illustrates how the amplitude of vibration of such detecting and control means is related to the degree of fluidization in a fluidized bed reactor.

The above stated objects have been accomplished in the present invention by inserting vertically into the fluid bed a rod which is flexibly supported at a point above the bed, as by a horizontally mounted leaf spring. The rod is urged into vertical oscillation by a vibrator or a suitable reciprocating drive mechanism tending to alternately insert and withdraw the rod into the bed. Such motion causes the support to vibrate. The amplitude of vibration is converted to an electrical signal which is directly proportional to the amplitude of the vibration. We have discovered that, over the entire fluidized region, the amplitude of vibration of the flexible support is directly proportional to the rate of gas flow, and to the degree of fluidization of the reactor bed. Thus, the signal output from the vibration pickup device, may be amplified and fed to a recorder, and/or a meter, and may be used to actuate a servo system which in turn controls the gas flow rate so as to effect the desired degree of bed fluidization. The signals recorded thus provide a continuous indication of the degree of fluidization in the reactor.

Referring first to FIG. 2, there is shown a graph on which the powder depth is plotted as a function of the gas flow in standard cubic feet per minute, and upon which the magnitude in millivolts of the signal derived from the vibrating flexible support is superimposed. The calibration of the aforesaid signal in terms of amplitude of vibration of the rod is also shown. It will be noted that the powder depth remained virtually constant with increase in gas flow from zero until it reached a value somewhat in excess of 3 s.c.f.m., at which time the powder depth began to increase. This increase continued until the gas flow reached approximately 6 s.c.f.m., at which time the signal from the pick-up device became virtually constant and the bed was substantially completely fluidized. The range of gas flow, through which the increase in powder depth can be observed visually, is referred to as the fluidized region. Examination of the signal curve indicates that the amplitude of vibration of the rod is extermely small when the gas flow is zero and that even though the bed depth does not perceptibly change as the gas flow is increased from zero, the vibration amplitude beings to increase immediately. Furthermore, it should be noted that throughout the fluidized region the curve is virtually a straight line with a relatively steep slope. Therefore, a relatively small change in degree of fluidization can be detected by a large change in signal produced. Equally important, the signal produced may be directly related to the degree of fluidization, since the curve is linear over the entire fluidized region.

FIG. 1 shows a two-stage fluid-bed reduction reactor. Two columns arranged for series powder flow and parallel gas flow comprise the fluid-bed reduction unit. Cracked ammonia or hydrogen mixed with nitrogen is introduced through stainless steel porous plates at the bottom of each stage of the reactor. Uranium trioxide is charged near the bottom of the first stage, and the outlet gases and solid product are discharged together near the top of the second stage. Both stages of the reactor are furnished with electrical heating elements and steam cooling coils. In order to determine the degree of fluidization in each stage, a vibratable rod and vibration detection system is disposed in each stage in the manner indicated above. Only the first stage is shown with such a rod and system for the sake of simplicity and clarity, it being understood that a similar detecting and flow controlling system is also provided for the second stage.

Referring now in more detail to FIG. 1, uranium trioxide is fed from a container 1 and through a feed pipe 2 into the hopper 3. The material is then fed by means of a screw 5 driven by a drive motor 4 into the first stage of the reactor at a point near the bottom thereof. The reactor tube 6 of the first stage is a pipe 6 inches in diameter and 36 inches long. The tube 6 is surrounded by a jacket 7 in which is embedded an electric heating coil 9, and a steam cooling pipe 8. The steam enters the cooling pipe 8 at the top of the reactor and exits at the bottom.

A porous plate 11 is sandwiched between annular plates 10 and 12. Plate 10 is affixed to the bottom of tube 6. A gas chamber 13 is affixed to plate 12. A source of gas is fed through tube 15, tube 16, flow regulating valve 17, and through tube 18 to the interior of gas chamber 13. The first stage reactor chamber has a closure member 14 affixed to the top thereof. A powder feed tube 30 is connected between the interior of the first stage reactor and the interior of the second stage reactor. An exit gas feed tube 31 is also connected between the reactors.

The second stage reactor is constructed in an identical manner to the first stage. The jacket 32 of the second stage has a top closure member 37 affixed thereto. The bottom of the second stage reactor has an assembly of an annular plate 33, porous plate 34, and annular plate 35 affixed thereto. A gas chamber 36 is affixed to annular plate 35. Gas is fed through tube 15, valve 38, and tube 39, to the interior of gas chamber 36. The product discharge from the second stage reactor is fed through a tube 40 and to reduction screw 41, in which the uranium dioxide is separated from the reaction gas. Uranium dioxide is then deposited in a container 42, and the exit gas is fed to a gas burner and gas filter through tube 43. The $UO_2$ is then fed to HF screws in the next stage of the process.

In order to obtain optimum reactor operating conditions, it is desirable to know at all times the degree of fluidization within the reactor chamber. This has been accomplished in the present invention by providing a vertically disposed rod 19 which is attached to the center of a horizontally mounted leaf spring 21, and which extends downwardly therefrom through a hermetically sealed bellows-type seal 20 to a point near the bottom of the reactor chamber 6. The outer ends of the leaf spring 21 are rigidly attached to non-movable supporting members 22 and 23. An oscillating force, approximating a sine wave, is applied in a vertical direction to the leaf spring 21 by a vibrator 25 attached to a vertical member 24 which contacts the leaf spring. The vibrator is rigidly attached to non-movable supporting members 28 and 29, by members 26 and 27, respectively, affixed to the vibrator housing.

Also attached to the leaf spring 21 is an amplitude sensing device or vibration pickup 44 designed to provide an electrical signal which is directly proportional to the amplitude of vibration of the spring. The output of the vibration pickup is connected by a lead 45 to an amplifier 46. The output of the amplifier 46 is connected to a meter 49 by lead 47, and lead 48, and to a recorder 51 by lead 47, and lead 50. The output from the amplifier 46 may also be connected by lead 47 and lead 52 to a simple servo system 53, which in turn is connected to the flow regulating valve 17 by the mechanical coupling 54. The rate of gas flow can be so controlled as to provide optimum operating conditions within the reactor, and to reduce channelling within the reactor. Since the amplitude of vibration of the leaf spring is directly proportional to the rate of gas flow, the rate of such flow to the reactor can be accurately controlled so as to provide the required degree of fluidization within the reactor for maximum efficiency in the reduction process.

The vibrator 25 used in FIG. 1 is such that the amplitude of the force applied by this vibrator is constant and independent of the amplitude of motion. It is required that the vibrator 25 operate at or near the resonant frequency of the leaf spring and rod arrangement for the reason that at the resonant frequency of a system, the amplitude of vibration thereof under conditions of constant force amplitude is strongly dependent upon the damping characteristics of said system. This may be accomplished by either the use of a variable frequency vibrator or by changing the resonant frequency of the rod and spring arrangement to match the frequency of a fixed frequency vibrator.

In one typical operation of the device of FIG. 1, the bed temperature of each reactor was maintained at approximately 1050° F., the inlet gas to the first reactor was approximately 2.25 lb. mols $H_2$ per hour and approximately 1.75 lb. mols $N_2$ per hour, the inlet gas to the second reactor was approximately 2.25 lb. mols $H_2$ per hour and approximately 0.75 lb. mols $N_2$ per hour, the powder feed was approximately 690 lbs. $UO_3$ per hour, the powder product was approximately 650 lbs. $UO_2$ per hour, the exit gas was approximately 2.17 lb. mols $H_2$ per hour, 2.50 lb. mols $N_2$ per hour, and 2.33 lb. mols $H_2O$ per hour, and the average retention time was approximately 2.5 hours. The above normal operating values will vary slightly depending upon the composition of the $UO_3$ feed powder.

It will be readily apparent to those skilled in the art that numerous variations and modifications of structure may be made without departing from the spirit and scope of the instant invention. For example, it is clearly evident that a coil spring in place of the leaf spring described above would be usable and under certain conditions even advantageous. Also, since the device described above provides a measure of the damping characteristics of the fluid bed and since such damping characteristics arise as a result of friction between the particles in said bed and vibrating rod, it is clear that the vibratory motion of the rod is not limited to a vertical direction.

This invention has been described by way of illustration rather than limitation and it should be apparent that the invention is equally applicable in fields other than those described.

What is claimed is:

1. The method of controlling the rate of gas flow into a fluid-bed reactor, into which powder material and gas are fed, so as to obtain substantially complete fluidization of said material within said reactor, comprising the steps of: feeding said powder material into said reactor at a selected controlled rate, feeding said gas into said reactor and through said powder material at a controlled rate, vibrating a spring-supported rod partially immersed in said material at the resonant frequency of said rod, continuously generating a signal proportional to the amplitude of vibration of said rod, said amplitude of vibration being a measure of the degree of fluidization within said reactor up to a threshold where complete fluidization takes place, and changing the rate of gas flow to said reactor in response to changes of said signal to stabilize said amplitude of vibration at a constant value corresponding to substantially complete fluidization within said reactor.

2. The method of indicating the degree of fluidization within a fluid-bed reactor into which powder material and gas are fed, comprising the steps of: feeding said powder material into said reactor at a selected controlled rate, feeding said gas into said reactor and through said powder material at a first controlled rate for fluidizing said powder material, vibrating a spring-supported rod partially immersed in said powder material at the resonant frequency of said rod, continuously generating an electrical signal proportional to the amplitude of vibration of said rod, said amplitude of vibration being a measure of the degree of fluidization within said reactor up to a threshold where complete flufiidization takes place and said signal stabilizes at a constant value, and displaying said signal to provide an indication of the degree of fluidization within said reactor.

References Cited in the file of this patent

UNITED STATES PATENTS

| | | |
|---|---|---|
| 1,935,445 | Heinz | Nov. 14, 1933 |
| 2,437,334 | Roetheli | Mar. 9, 1948 |
| 2,560,356 | Liedholm | July 10, 1951 |
| 2,744,408 | Seney | May 8, 1956 |
| 2,746,291 | Swengel | May 22, 1956 |
| 2,782,633 | Strauss et al. | Feb. 26, 1957 |
| 2,811,414 | Murphree | Oct. 29, 1957 |
| 2,890,106 | Heath | June 9, 1959 |
| 2,911,290 | Jonke et al. | Nov. 3, 1959 |

OTHER REFERENCES

Shuster et al.: "Chem. Eng. Progress," vol. 48, No. 9, pages 455–458 (September 1952).